Figure 2:
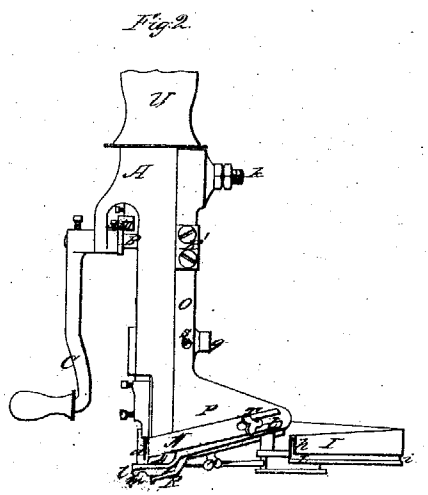

No. 3,343. REISSUED MAR. 30, 1869.

L. GODDU.

HAND PEGGING MACHINE.

2 SHEETS—SHEET 1.

Witnesses:
John Rathbone Jr
Thomas J. Tindall

Assignee
R. W. Drew
by his atty.
E. S. Renwick

No. 3,343. REISSUED MAR. 30, 1869.
L. GODDU.
HAND PEGGING MACHINE.
2 SHEETS—SHEET 2.
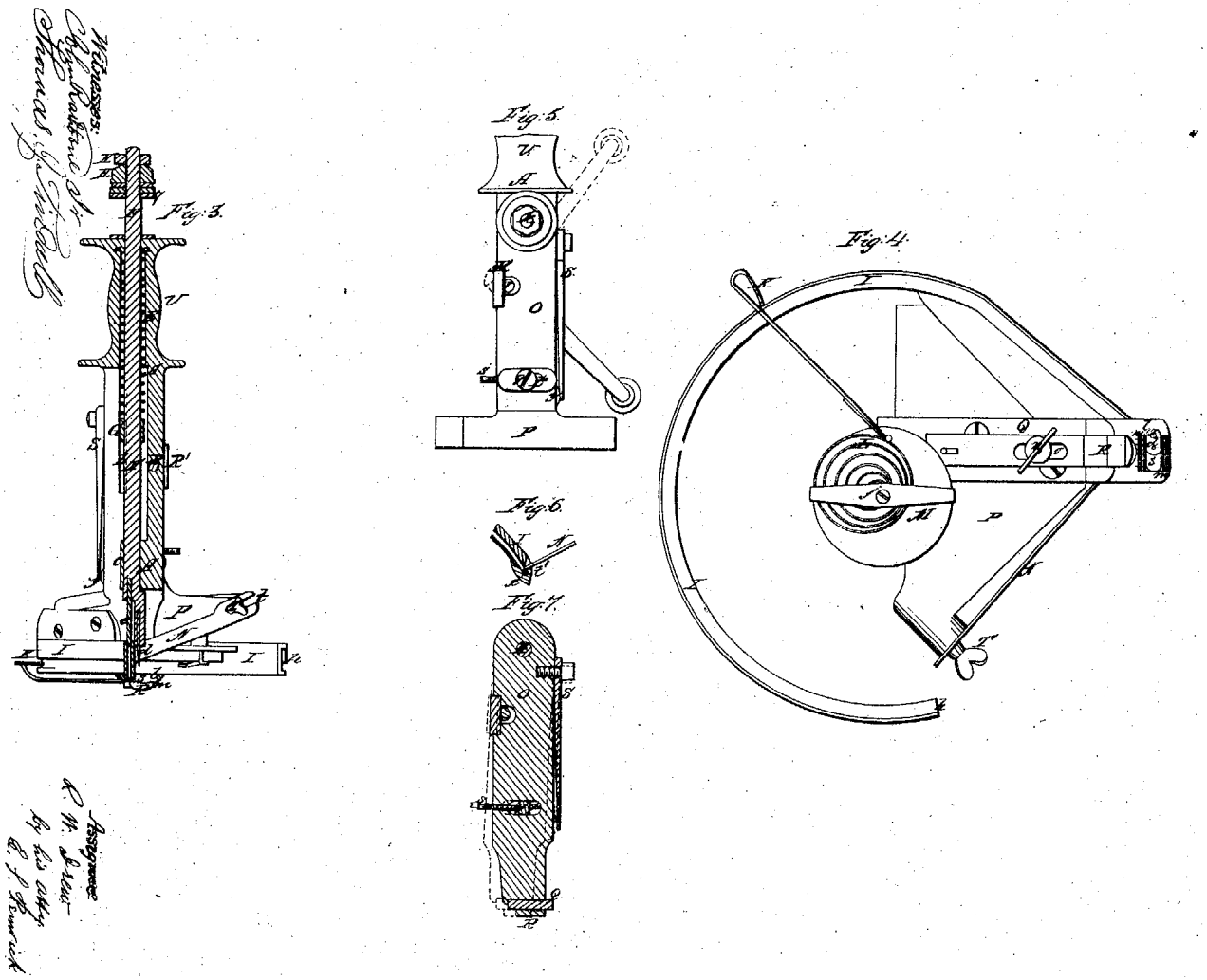
Witnesses:
John Ratbone Jr
Thomas L. Tindell
Assignee
R. W. Drew
by his atty
E. S. Renwick

UNITED STATES PATENT OFFICE.

LOUIS GODDU, OF LOWELL, MASS., ASSIGNOR TO REUBEN W. DREW.

IMPROVED HAND PEGGING-MACHINE.

Specification forming part of Letters Patent No. 51,387, dated December 5, 1865; Reissue No. 3,343, dated March 30, 1869.

*To all whom it may concern:*

Be it known that I, LOUIS GODDU, of Lowell, in the county of Middlesex and State of Massachusetts, have invented certain new and useful Improvements in Machines for Pegging Boots and Shoes, of which the following is a full, clear, and exact description.

Pegging-machines as constructed previously to my invention may be divided into two classes—viz., those in which the frame of the machine is a fixture and supports the shoe which is moved along or caused to travel in the machine as the pegging proceeds, and those in which the frame of the machine is constructed to travel upon the shoe or boot as a support, the shoe or boot during its pegging being held stationary by some fixed rest, and the frame of the machine being portable and having no connection with such rest.

My invention relates to machines of the second class; and its object is to enable such a machine to be more conveniently manipulated to enable it to move automatically along the sole to be pegged, and to improve the construction and operation of the mechanism by which the pegs are fed and driven.

To this end my invention consists of certain combinations of the following instrumentalities, viz, first, a portable traveling frame carrying a spring of sufficient strength to drive the pegging-awl and the pegs, and constructed to be supported by and to move over the sole to be pegged; second, a driving-spring to drive the awl and the peg, or either of them; third, a crank-handle, by means of which the driving-spring is strained; fourth, a plunger to hold and transmit power to the pegging-awl, which pierces the leather for the entrance of the peg; fifth, a stop upon the plunger to limit the distance to which the plunger is moved relatively to the portable frame or to the under surface of the traveling foot, hereinafter mentioned; sixth, a gage to bear against the edge of the sole to which the implement is applied, and to regulate the distance of the awl and the peg-driver, or either of them, from that edge; seventh, a peg-tube to direct the peg during its driving; eighth, a peg-driver actuated by the driving-spring so as to drive the peg through the peg-tube; ninth, a peg-feeder, or feeding mechanism, by means of which the slip of peg-wood is held and presented to the peg-driving mechanism; tenth, a knife, by means of which the pegs are cut in succession from the peg-wood, as required in the operation of the machine; eleventh, a handle, which can be grasped by the operator, and by means of which the implement is held by the operator in its proper position while traveling over the sole of the shoe; twelfth, a traveling foot which is alternately rested upon the sole of the shoe or boot to support the weight of the traveling frame and to form a base of resistance for its advance, and is alternately advanced while the pegging-awl is in the leather to a new point or base for the support of the machine in a new place and for a new advance of the traveling frame and its appurtenances over the stationary sole.

The mode in which I prefer to combine the said instrumentalities and the new combinations of them which I have produced will appear from the following description of a hand-pegging machine embodying them and from the specifications at the close of the said description.

The machine is represented in the accompanying drawings.

Figure 1:
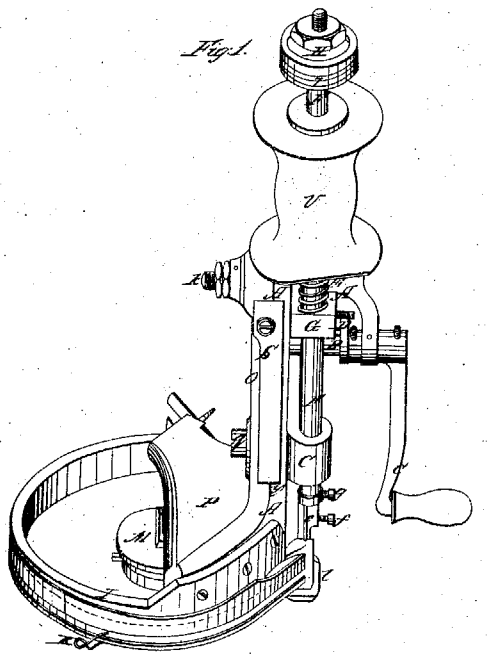

Figure 1 is a perspective view of the said machine. Fig. 2 is an elevation of the lower portion of one side of the same. Fig. 3 is a vertical section of the same through the axis of the plunger. Fig. 4 is a plan of the under side of the machine, (full size.) Fig. 5 is a rear elevation of a portion of the same. Fig. 6 is a horizontal section of the end of the peg-trough and the knife. Fig. 7 is a vertical section of the vibrating foot and its appurtenances.

In the said drawings, A is the portable frame of the machine in suitable bearings, in which runs the shaft B, which is actuated by the hand of the user applied to the crank C.

D is a lifting-arm adjusted and secured in place upon the driving-shaft B by means of a set-screw. The upper end of the frame A is bored out for the reception of a spiral driving-spring, E, which surrounds the plunger F, which is raised against the pressure of the spring E, the upper end of the spring E bearing upon a shoulder, *a*, in the frame-work A, while the lower end of the spring E rests upon a block, G, which surrounds the plunger F, and is securely attached thereto by a set-screw. One end of the block G has projecting from it a lip, which moves in a narrow vertical groove, *b*, in the side of the frame-work A, which, in connection with the guide *c* below it, guides the plunger in its movement and keeps it always in a proper position for performing its office.

Within a projecting portion of the lower end of the plunger F is formed an aperture for the reception of an awl, *d*, and in a similar recess bored in a line with the axis of the plunger F is placed a rod or "peg-driver," *e*.

After the awl *d* and peg-driver *e* are adjusted to their proper height, they are secured in place by their screws *f g*, and as they are both attached to the plunger F they have no movement independently of each other. The upper end of the plunger F projects through the frame-work A and terminates in a screw-thread, upon which turn the circular nuts H. The innermost of these nuts rests upon the upper end of the frame when the plunger F is depressed, and thus forms a stop to limit the point to which the plunger can be moved relatively to the frame by the action of the driving-spring E. Below these nuts H and around the plunger are placed leather or other elastic washers 7, for the purpose of reducing the force of the concussion which takes place when the plunger is suddenly depressed by the spring E, and as the washers 7 are gradually worn away the nuts H may be screwed down upon them, so as to stop the movement of the plunger at the desired point.

To the bottom of the frame A is screwed or otherwise secured the peg-trough I, of the form seen in Figs 1 and 4. The outer end, *h*, of the peg-trough I is open for the admission of the strip of peg-wood J, (shown in red,) which rests on the shoulder *i* and is pressed forward by the finger K, actuated by a flat spiral spring, L, pivoted at *j* to a circular plate, M, proceeding from the enlarged base of the vibrating beam O, a description of which will be given hereinafter.

The peg-trough, finger, and spring constitute the peg-feeder of the machine. The inner end of the peg-trough terminates in a passage, *x*, for the peg-driver to work in, and this passage is open at one side to admit the end of the strip of wood from which the pegs are cut off separately by the knife N, whose cutting-edge enters the peg-trough transversely through an opening in its side, and, in connection with the sides of the passage *x*, forms the peg-tube, by which the peg is directed while being driven into the sole.

From the inner side of the frame-work A projects a stud or pin, *k*, upon which is pivoted a vibrating beam, O, the base P of which is enlarged and of the form shown in Figs. 1 and 4. The under side of the base P is inclined downward toward the lower end of the peg-tube at the end of the peg-trough, and has firmly fastened to it the inclined bar Q, which is bent to form a foot, *l*, through which is cut a slot, S, for the passage of the awl and peg-driver. The under side of the foot *l* is roughened or provided with teeth *m*, to prevent it from sliding when resting upon the sole of the boot or shoe to be pegged.

The relative positions of the projecting portion of the lower end of the plunger and of the foot, when the parts of the machine are properly adjusted by means of the screw-nuts H and the plunger is down, are such that the end of said portion then projects slightly beyond the under side of the foot, so that the foot does not then touch the sole of the shoe.

R is a gage, by means of which the distance of the pegs from the edge of the sole is regulated, the gage being constructed by preference to slide out and in on the bottom of the bar Q, and being secured in position by the clamp-screw *n* passing through the slot *o* into the bar Q.

The beam O is provided with a slot, *p*, through which passes a screw-pin, *q*, which holds the lower portion of the beam O from separating laterally from the frame A, while allowing the beam to vibrate on the pin *k*. A flat spring, S, is secured at its upper end to the beam O, and the lower end of this spring bears against a projection, *y*, protruding from the frame A, so that the tendency of this spring is to advance the lower part of the frame A, and thus, when the foot is stationary, move the pegging-awl and peg-driver forward in the slot of the foot *m*. The distance to which the awl and peg-driver can be so moved is determined by the set-screw *s*, which is screwed into the beam O, and, projecting into the slot *p*, limits the distance to which the screw-pin *q* and the frame, awl, and driver, connected with said screw-pin, can move forward. The spring S is strained when the pegging-awl is in the leather, and the foot *l* is caused to advance, by the revolution of the driving-shaft B in the following manner: The end of the driving shaft is flattened at one side, as seen at *r*, and passes into an aperture in the beam O, which aperture is closed at one side by plate R′, against which the side of the driving-shaft can bear. When the awl is in the leather and the frame is thereby held fast, the flat side of the driving-shaft is opposite the plate R′. Consequently the turning of the driving-shaft causes the rounded part thereof to bear against said plate, and to cause it and the beam and foot *l* (with which the plate is connected) to vibrate upon the stud *k*, and thereby strain the spring S while the foot *l* is advancing over the sole of the shoe to a more forward place.

The knife N is secured to the base P by means of a clamp-screw, T, the shank of the knife being constructed with an open slot, *t*, through which the clamp-screw passes, so that the knife may be moved along the base P for the purpose of adjustment. The blade of the knife is made flexible, and is of a width equal to the height of the passage which forms the peg-tube, against the side or shoulder *t′* (Fig.

6) of which it bears and holds the peg in place after being cut. The upper part of the frame A is formed into a handle, U, by which the machine is held and maintained in an erect position.

Operation. The awl *d* and peg-driver *e* being down (in which positions the flattened side *r* of the driving-shaft is opposite the plate R′) and the peg-trough I being supplied with the peg-wood, the distance to which the pegs should be placed from the edge of the sole is regulated by the adjustment of the gage R. The operator grasps the handle or upper portion, U, of the frame A with one hand and places the implement upon the sole to be pegged, whereupon the awl is pressed into the sole by the weight of the machine, aided, if necessary, by the pressure of the hand upon the handle U, so that the end of the plunger F bears upon the sole, the foot *l* being slightly above the sole by reason of the relative adjustment of the foot and plunger before mentioned. The crank C is now turned by the other hand and the flattened side *r* of the driving-shaft is brought round underneath, (as seen in red, Fig. 7,) as, by this operation the rounded part of the shaft is borne against the plate R′, the beam O is thrown forward on its pivot *k*, carrying with it the slotted foot *l* and knife N, while at the same time, the spring S is strained. The foot *l* is thus advanced, or caused to step forward over the sole of the shoe, and the edge of the knife N (connected with the foot) is at the same time withdrawn from the peg-trough, so that the strip of peg-wood can be moved forward therein by the pressure of the spring L when the rise of the peg-driver permits this movement. The crank C continuing to revolve the lifting-arm D comes under and lifts the block G against the resistance of the driving-spring E, and the peg-driver is raised, and the awl is withdrawn from its hole in the sole, while the teeth *m* of the foot-piece *l* are brought down thereon by the weight of the machine.

The awl and peg-driver continue to rise with the plunger until the flattened portion *r* of the driving-shaft again comes opposite the plate R′, when the pressure of the spring S causes the whole frame to move forward on the stud *k* as an axis, so that the plunger F, with the awl *d* and peg-driver *e*, (all carried by said frame,) are moved forward to a new place. The peg-trough, being secured to the frame A, is advanced simultaneously with the awl and peg-driver, and as the rise of the peg-driver has meanwhile permitted the finger K to press the peg-wood endwise in the trough until the end of the peg-wood fills the peg-tube, the forward movement of the said trough with the frame A forces the side of the strip of peg-wood into contact with the knife N, which, entering the trough, splits off a single peg and retains it in the peg-tube (see Fig. 6) in a position to be struck squarely by the driver when it descends, the flexible blade of the knife extending the whole width of the peg-wood and constantly pressing against the shoulder *t′* of the peg-tube, by which arrangement the pegs are cut separately in the peg-tube of a uniform thickness just previous to their being driven. As the crank continues to be turned the lifting-arm D passes from under the block G, and the spring E, being thereby released, drives the awl into the sole to punch a new hole, while the peg-driver is simultaneously driven against the peg so as to drive it into the hole last made by the awl. The continued revolution of the crank causes a repetition of the above operations, and the progressive advance of the implement along the sole by the alternate stepping forward of the foot and awl.

When it is required to make the holes simply to be afterward filled with metallic nails, the cutting and feeding of the pegs may be interrupted by arresting the motion of the peg-feeding mechanism, and the peg-tube and peg-driver become for the time inoperative. The distance between the holes can be regulated by regulating the stride of the foot.

The plunger may carry an awl, or a driver, or both.

I do not claim severally as my invention any one instrumentality that I have described, but

What I claim as my invention, and desire to secure by Letters Patent, are the following combinations in pegging-machines, viz:

1. The combination of the portable traveling frame, the handle by which the implement is held, the driving-spring, and the pegging-awl plunger, the whole constructed to operate substantially as before set forth.

2. The combination of the portable traveling frame, the handle by which the implement is held, the driving-spring, and the peg-driver, the whole constructed to operate substantially as before set forth.

3. The combination of the portable traveling frame, the handle by which the implement is held, the driving-spring, the plunger, and the crank-handle, the whole constructed to operate substantially as before set forth.

4. The combination of the portable traveling frame, the driving-spring, the plunger, and the stop for the plunger, the whole constructed to operate substantially as before set forth.

5. The combination of the portable traveling frame, the driving-spring, the crank-handle, the plunger, and the stop for the plunger, the whole constructed to operate substantially as before set forth.

6. The combination of the portable traveling frame, the driving-spring, crank-handle, peg-driver, and peg-tube, the whole constructed to operate substantially as before set forth.

7. The combination of the portable traveling frame, the driving-spring, peg-driver, peg-tube, and peg-feeder, the whole constructed to operate substantially as before set forth.

8. The combination of the portable traveling frame, the driving-spring, peg-driver, peg-feeder, and knife, the whole constructed to operate substantially as before set forth.

9. The combination of the portable traveling frame and the traveling foot, the whole constructed to operate substantially as before set forth.

10. The combination of the portable traveling frame, the handle by which the implement is held, and the traveling foot, the whole constructed to operate substantially as before set forth.

11. The combination of the portable travel ing frame, the driving-spring, the plunger, and the traveling foot, the whole constructed to operate substantially as before set forth.

12. The combination of the portable traveling frame, the handle by which the implement is held, the driving-spring, the plunger, and the traveling foot, the whole constructed to operate substantially as before set forth.

13. The combination of the portable traveling frame, the driving-spring, the plunger, the stop for the plunger, and the traveling foot, the whole constructed to operate substantially as before set forth.

14. The combination of the portable traveling frame, the driving-spring, the plunger, the traveling foot, and the gage, the whole constructed to operate substantially as before set forth.

15. The combination of the portable traveling frame, the handle by which the implement is held, the driving-spring, the plunger, the traveling foot, and the gage, the whole constructed to operate substantially as before set forth.

16. The combination of the portable traveling frame, the driving-spring, the plunger, the stop, and the gage, the whole constructed to operate substantially as before set forth.

17. The combination of the portable traveling frame, the driving-spring, the plunger, the stop, the gage, and the traveling foot, the whole constructed to operate substantially as before set forth.

18. The combination of the portable traveling frame, the driving-spring, the plunger, the crank-handle, and the traveling foot, the whole constructed to operate substantially as before set forth.

19. The combination of the portable traveling frame, the driving-spring, the peg-driver, peg-feeding apparatus, peg-tube, and traveling foot, the whole constructed to operate substantially as before set forth.

20. The combination of the portable traveling frame, the driving-spring, peg-driver, peg-feeding apparatus, peg tube, traveling foot, and gage, the whole constructed to operate substantially as before set forth.

21. The combination of the portable traveling frame, the driving-spring. peg-driver, peg-tube, and traveling foot, the whole constructed to operate substantially as before set forth.

22. The combination of the portable traveling frame, the driving-spring, peg-driver, peg-tube, traveling foot, and gage, the whole constructed to operate substantially as before set forth.

23. An organized hand-pegging machine containing the devices constructed, arranged, and combined to operate substantially as described, by which, while with one hand the machine is held to the work, with the other it is moved over the work, the holes punched, and the pegs furnished and driven at regular distances, substantially in the manner set forth.

Witness my hand to the foregoing specifications.

LOUIS GODDU.

Witnesses:
C. H. W. WOOD,
A. B. ELY